US008803115B2

(12) United States Patent
Leucht et al.

(10) Patent No.: US 8,803,115 B2
(45) Date of Patent: Aug. 12, 2014

(54) COATED MICROFIBROUS WEB AND METHOD FOR PRODUCING THE SAME

(75) Inventors: Thomas Leucht, Fulda (DE); Barbara Ballsieper, Munich (DE)

(73) Assignee: Mavig GmbH, Munich (DE)

( * ) Notice: Subject to any disclaimer, the term of this patent is extended or adjusted under 35 U.S.C. 154(b) by 82 days.

(21) Appl. No.: 13/390,412

(22) PCT Filed: Aug. 10, 2010

(86) PCT No.: PCT/EP2010/061631

§ 371 (c)(1), (2), (4) Date: Apr. 4, 2012

(87) PCT Pub. No.: WO2011/018459

PCT Pub. Date: Feb. 17, 2011

(65) Prior Publication Data

US 2012/0181458 A1 Jul. 19, 2012

Related U.S. Application Data

(60) Provisional application No. 61/234,014, filed on Aug. 14, 2009.

(30) Foreign Application Priority Data

Aug. 14, 2009 (DE) ......................... 10 2009 037 565

(51) Int. Cl.

| | |
|---|---|
| ***G21F 3/02*** | (2006.01) |
| ***B32B 5/02*** | (2006.01) |
| ***B32B 27/04*** | (2006.01) |
| ***B32B 27/12*** | (2006.01) |
| ***D04H 1/00*** | (2006.01) |
| ***D04H 1/06*** | (2012.01) |

(52) U.S. Cl.

USPC ......... 250/519.1; 250/516.1; 442/82; 442/92; 442/131; 442/132; 442/340; 442/359

(58) Field of Classification Search

USPC ............. 250/515.1, 516.1, 519.1; 442/65-75, 442/82, 88, 92, 94, 98, 131-133, 340-360

See application file for complete search history.

(56) References Cited

U.S. PATENT DOCUMENTS

| | | | | |
|---|---|---|---|---|
| 4,112,175 A * | 9/1978 | Kikuchi et al. | ............... | 442/136 |
| 4,812,356 A * | 3/1989 | Meyer et al. | .................. | 428/220 |

(Continued)

FOREIGN PATENT DOCUMENTS

| | | |
|---|---|---|
| CN | 1103122 A | 5/1995 |
| CN | 2745739 Y | 12/2005 |

(Continued)

OTHER PUBLICATIONS

English Abstract to Japanese Application Publication No. JP 63-243383 A to Sato et al., Oct. 1998.*

(Continued)

*Primary Examiner* — Jeremy R Pierce

(74) *Attorney, Agent, or Firm* — Scully, Scott, Murphy & Presser, PC

(57) ABSTRACT

The present invention relates to a coated microfibrous web, a process for producing the same, use thereof as a covering of a radiation protection material as well as a radiation protection device. The coated microfibrous web comprises:

(i) a microfibrous web impregnated with a fluoropolymer; and (ii) a layer comprising polyurethane, which is present only on one side of the microfibrous web.

14 Claims, 1 Drawing Sheet

(56) References Cited

U.S. PATENT DOCUMENTS

| | | | | |
|---|---|---|---|---|
| 4,923,741 | A | 5/1990 | Kosmo et al. | |
| 5,922,445 | A | 7/1999 | Yoshida et al. | |
| 2005/0211930 | A1 * | 9/2005 | DeMeo et al. | 250/516.1 |
| 2009/0272921 | A1 * | 11/2009 | Ballsieper | 250/515.1 |

FOREIGN PATENT DOCUMENTS

| | | | | |
|---|---|---|---|---|
| CN | 101157822 | A | | 4/2008 |
| DE | 10 2004 001 328 | A1 | | 4/2005 |
| DE | 10 2005 034 384 | A1 | | 2/2007 |
| DE | 10 2006 028 958 | A1 | | 12/2007 |
| GB | 2 118 410 | A | | 10/1983 |
| JP | 63243383 | A | * | 10/1988 |
| JP | 11-302980 | A | | 11/1999 |
| WO | 2004/017332 | A | | 2/2004 |
| WO | 2005/023116 | A1 | | 3/2005 |
| WO | 2005/024846 | A1 | | 3/2005 |
| WO | WO 2007147642 | A1 | * | 12/2007 |

OTHER PUBLICATIONS

Full English Translation to Japanese Patent Application Publication No. JP 63-243383 A to Sato et al., Oct. 1998.*

Official Action, dated Mar. 29, 2013, received from the Chinese Patent Office in corresponding Chinese Patent Application No. CN 201080035987.0.

International Search Report dated Dec. 21, 2010, issued in corresponding International Application No. PCT/EP2010/061631.

Official Action dated Aug. 14, 2009 received from the German Patent Office in corresponding German Patent Application No. DE 10 2009 037 565.

* cited by examiner

COATED MICROFIBROUS WEB AND METHOD FOR PRODUCING THE SAME

CROSS-REFERENCE TO RELATED APPLICATIONS

This application claims the benefit of U.S. Provisional Application No. 61/234,014 filed on Aug. 14, 2009.

TECHNICAL FIELD

The present invention is directed to a coated microfibrous web, a process for producing the same, use thereof as a covering of a radiation protection material as well as a radiation protection device.

TECHNICAL BACKGROUND

U.S. Pat. No. 4,923,741 discloses a flexible multi-layered covering article for protection against the hazards of exposure to the environment in outer space. The covering includes, inter alia, a layer intended for protection against, for example, Bremsstrahlung.

GB 2 118 410 A describes an article affording protection against radiation comprising at least one flexible layer of lead-containing material in an envelope of, or sandwiched between two layers of a knitted, woven or non-woven fabric, wherein the knitted, woven or non-woven fabric carries a coating of flexible polyurethane on its outer surface. However, the inventors of the present invention have found that such articles for protection against radiation having a polyurethane coating on the outer surface are subjected to a very high degree of abrasion when they are used for example in medical applications.

Thus, it was one object of the present invention to provide a microfibrous web having improved abrasion resistance.

SUMMARY OF THE INVENTION

One embodiment of the present invention is directed to a coated microfibrous web comprising:

(i) a microfibrous web impregnated with a fluoropolymer; and (ii) a layer comprising polyurethane which is present only on one side of the microfibrous web.

In another embodiment, the invention is directed to a process for producing a coated microfibrous web, comprising the following steps:

(a) providing a microfibrous web;

(b) impregnating the microfibrous web with an impregnation composition comprising fluoropolymer;

(c) drying the impregnated microfibrous web;

(d) applying a coating composition comprising polyurethane to only one side of the dried, impregnated microfibrous web; and (e) thermal treatment of the microfibrous web obtained in step (d).

Another subject matter of the present invention is the use of the coated microfibrous web of the present invention as a covering of a radiation protection material wherein the coated microfibrous web is provided on at least one side of the radiation protection material and wherein the side coated with polyurethane is adjacent to the radiation protection material.

Another embodiment of the invention is directed to a radiation protection device comprising (α) a radiation protection material; and (β) a coated microfibrous web according to the present invention wherein the coated microfibrous web is provided on at least one side of the radiation protection material and wherein the side coated with polyurethane is adjacent to the radiation protection material.

COATED MICROFIBROUS WEB

Figure 1:
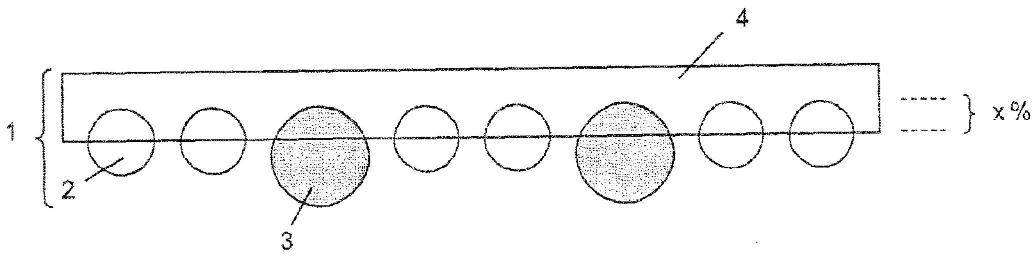
FIG. 1 shows a schematic view of a cross-section of the coated microfibrous web according to the present invention.

The present invention is directed to a coated microfibrous web comprising (i) a microfibrous web impregnated with a fluoropolymer; and (ii) a layer comprising polyurethane which is present only on one side of the microfibrous web.

The microfibrous web is not particularly restricted. It can be any planar construct, such as a woven fabric, hosiery, knitted fabric, membrane or non-woven fabric containing microfibers. Woven fabric is preferred.

Microfibers are fibers having a fiber thickness of about 0.5 dtex to about 1.5 dtex, preferably about 0.3 dtex to about 1.0 dtex. The type of microfiber depends on the intended use. Examples of suitable types of microfibers include microfibers based on polyester, polyamide, cellulose (e.g. acetate or viscose) and polytetrafluoroethylene as well as mixtures thereof. Polyester- and/or polyamide-based microfibers are especially suitable.

The microfibrous web can comprise conductive fibers in order to avoid electrostatic charge. The conductive fibers are not particularly restricted. Examples include carbon or metal fibers or polymer-based fibers, for example polymer fibers, comprising carbon or metal particles. In a preferred embodiment, polymer fibers comprising carbon particles are used. For example, the conductive fibers have a fiber thickness of about 1 dtex to about 3 dtex, preferably about 1.2 dtex to about 2 dtex. If the diameter of the conductive fibers is larger (preferably about 1.2 to about 3 times larger, more preferably about 1.2 to about 2 times larger) than the diameter of the microfibers, the conductive fibers protrude from the surface of the woven fabric. The person skilled in the art can select the appropriate amount of conductive fibers based on his technical knowledge. Usually, the microfibrous web will comprise about 0.1 wt.-% to about 10 wt.-%, preferably about 0.5 wt.-% to about 3 wt.-%, of conductive fibers, wherein the weight percentage refers to the total weight of the fibers in the uncoated microfibrous web. In a preferred embodiment, the finished microfibrous web should have an electrostatic surface resistance of about $10^5$ ohm to about $10^8$ ohm (measured according to DIN 100015-1 at 25% rel. humidity and 23° C.).

The microfibers and the optionally present conductive fibers are manufactured into a microfibrous web using known processes. The conductive fibers can be incorporated into the microfibrous web statistically or in a regular arrangement. The type of incorporation will depend on the need for the discharge of electric charges as well as on the process used to manufacture the microfibrous web. In a preferred embodiment, the conductive fibers are incorporated in a regular arrangement. They can for example be incorporated in a lattice design since this configuration is especially suitable for discharging possible electrostatic charges. The distances between the lattice lines are preferably in the range of about 3 mm to about 100 mm, preferably about 5 mm to about 75 mm, wherein the side lengths of the lattice rectangles can differ from each other.

The air permeability of the microfibrous web used as starting material is selected by the person skilled in the art depending on its intended use. In one embodiment, the air permeability is 0 to about 100 l/min per $dm^2$, preferably 5 to about 50 l/min per $dm^2$, wherein the air permeability is measured according to DIN EN ISO 9237.

The surface density of the microfibrous web used as starting material is also selected in view of the intended use. The surface density will usually be in the range of about 50 $g/m^2$ to about 200 $g/m^2$, preferably about 60 $g/m^2$ to about 150 $g/m^2$.

The thickness of the microfibrous web used as starting material is not particularly restricted. It will usually be selected in view of the intended use. In one embodiment, the microfibrous web has a thickness in the range of about 0.05 mm to about 0.20 mm, preferably about 0.10 mm to about 0.15 mm.

The microfibrous web is impregnated with fluoropolymer. The fluoropolymer can be a partially fluorinated or perfluorinated polymer. Both homopolymers and copolymers are suitable. Fluoroalkyl acrylate homopolymers and fluoroalkyl acrylate copolymers are especially suitable.

Preferred fluoropolymers have perfluoroalkyl-containing side groups. These side groups can for example be introduced into the fluoropolymer by polymerization of perfluoroalkyl-containing monomers having the following structure:

Perfluoroalkyl unit—optional spacer—polymerizable group

The perfluoroalkyl unit preferably comprises about 4 to about 12 carbon atoms. The optional spacer is not particularly restricted, with the proviso that it is not a perfluoroalkyl unit. It preferably comprises about 2 to about 10 atoms, more preferably about 2 to about 8 atoms, in the chain. Both carbon atoms and heteroatoms such as N, O and S can be present in the spacer. The polymerizable group is not particularly restricted and can be any polymerizable group suitable for forming a polymer. Examples of polymerizable groups include ethylenically unsaturated groups.

Examples of perfluoroalkyl-containing monomers include perfluoroalkyl-containing acrylates of the formula $$H_2C{=}CR{-}C(O){-}O{-}(CH_2)_n{-}C_mF_{2m+1}$$

wherein

R is H or $CH_3$;

n is 0 to about 8, preferably 0 to about 6; and m is about 4 to about 12.

The fluoropolymers can comprise further side groups, with alkyl-containing side groups and/or functional side groups being particularly suitable. In one embodiment, the fluoropolymer can comprise alkyl-containing side groups.

These side groups can for example be introduced into the fluoropolymer by polymerizing alkyl-containing monomers having the following structure:

Alkyl unit—optional spacer—polymerizable group

The alkyl unit preferably comprises about 1 to about 12 carbon atoms. The optional spacer is not particularly restricted, with the proviso that it is not an alkyl unit. It preferably comprises about 0 to about 20 atoms, more preferably about 0 to about 10 atoms, in the chain. Both carbon atoms and heteroatoms such as N, O and S can be present in the spacer. The polymerizable group is not particularly restricted and can be any polymerizable group suitable for forming a polymer. Examples of polymerizable groups include ethylenically unsaturated groups.

Examples of alkyl-containing monomers include alkyl-containing acrylates of the formula $$H_2C{=}CR{-}C(O){-}O{-}C_pH_{2p+1}$$

wherein

R is H or $CH_3$; and p is about 1 to about 12.

In one embodiment, the fluoropolymer can comprise functional side groups.

These side groups can for example be introduced into the fluoropolymer by polymerizing functional monomers having the following structure:

Functional unit—optional spacer—polymerizable group

The functional unit is not particularly restricted and can comprise any functional group. Examples of functional groups include OH, SH, $NH_2$, N-methylolsulfonamides etc. The functional unit preferably comprises about 0 to about 20 carbon atoms, preferably about 0 to about 12 carbon atoms. The optional spacer is not particularly restricted, with the proviso that it is not an alkyl unit. It preferably comprises about 0 to about 20 atoms, more preferably about 0 to about 10 atoms, in the chain. Both carbon atoms and heteroatoms such as N, O and S can be present in the spacer. The polymerizable group is not particularly restricted and can be any polymerizable group suitable for forming a polymer. Examples of polyinerizable groups include ethylenically unsaturated groups.

Examples of functional monomers include acrylates of the formula $$H_2C{=}CR{-}C(O){-}O{-}C_pH_{2p}X$$

wherein

R is H or $CH_3$;

p is about 1 to about 12; and

X is a functional group selected from OH, SH, $NH_2$, and N-methylolsulfonamides.

Examples of commercially available fluoropolymers include Evoral®, Oleophobol, Scotchguard, Tubiguard, Repellan, Ruco-Guard, Unidyne, Quecophob and Nuva, but are not restricted to these products.

The impregnated microfibrous web preferably comprises about 0.2 g to about 5 g, more preferably about 0.2 g to about 1.2 g, fluoropolymer based on 100 g microfibrous web used as starting material. When an appropriate amount of fluoropolymer is used, the coated microfibrous web exhibits good long-term water and oil repellency, adherence to the substrate and good handling.

Furthermore, if necessary, the impregnation composition can comprise additives such as silicones, waxes and salts (for example zirconium salts).

A layer comprising polyurethane is applied to one side of the microfibrous web. The coated microfibrous web can easily be cleaned due to the layer comprising polyurethane. Furthermore, this layer guarantees impermeability to water and protection against the penetration by microorganisms such as bacteria. The layer comprising polyurethane is preferably applied to one surface of the microfibrous web in form of a continuous layer. The layer should have a uniform thickness. The basis weight of the layer is preferably in the range of about 3 $g/m^2$ to about 50 $g/m^2$, more preferably in the range of about 8 $g/m^2$ to about 20 $g/m^2$.

All polyurethane homopolymers and copolymers can be used as polyurethanes. Inter alia, polyurethane block copolymers such as polyester polyurethanes and polyether polyol polyurethanes can be used. The polyester and polyether polyols usually have a molecular weight of about 4,000 to about 6,000. One example of a commercially available product is Impranil®.

The layer comprising polyurethane can also contain other components in addition to polyurethane. One possible component is a fluororesin. The fluororesin can be identical to or different from the fluoropolymer. The fluororesin is preferably identical to the fluoropolymer so that the statements made above with respect to the fluoropolymer apply here as well.

The fluororesin is preferably present in the layer in an amount of 0 to about 10 parts by weight, more preferably about 0.5 to about 3 parts by weight, based on 100 parts by weight of polyurethane.

The layer comprising polyurethane can also comprise auxiliary agents. Silicon dioxide is an optional auxiliary agent. The addition of silicon dioxide improves the sterilizability with gases such as ethylene oxide. Silicon dioxide is preferably used in the layer in the form of silicic acid.

The size of the silicon dioxide particles is usually in the range of about 0.2 μm to about 10 μm preferably about 0.2 μm to about 5 μm. Silicon dioxide is preferably present in the layer in an amount of 0 to about 10 parts by weight, more preferably about 1 to about 5 parts by weight, based on 100 parts by weight of polyurethane.

The layer comprising polyurethane can also comprise titanium dioxide. Titanium dioxide serves as a matting agent. The size of the titanium dioxide particles is usually in the range of about 0.2 μm to about 10 μm, preferably about 0.2 μm to about 5 μm. Titanium dioxide is preferably present in the layer in an amount of 0 to about 5 parts by weight, more preferably about 0.2 to about 2 parts by weight, based on 100 parts by weight of polyurethane.

Furthermore, the layer comprising polyurethane can comprise further additives such as deaerators, fungicides, additives for increasing scratch resistance, water repellents, thickeners, rheological additives, flow improvers etc. These additives are either additives for the production of the layer or improve the properties of the finished layer. The person skilled in the art can select the appropriate additives based on his technical knowledge. The additives are preferably present in the layer in an amount of 0 to about 20 parts by weight, more preferably about 0.5 to about 10 parts by weight, based on 100 parts by weight of polyurethane.

Process for Producing the Coated Microfibrous Web

The coated microfibrous web according to the present invention can be produced using various processes. A preferred process will be described in the following.

(a) Providing a Microfibrous Web

First, a microfibrous web is provided. The microfibrous web used as starting material has been described in detail above.

The microfibrous web can be used as is in the process of the present invention. However, if desired, it can also be subjected to a pretreatment, for example to increase hydrophilicity. The pretreatment for example to increase hydrophilicity can be carried out using processes known in the art. Non-ionic surfactants, fatty acid condensates, silicones and mixtures thereof can be used as means to increase hydrophilicity.

The means to increase hydrophilicity are applied to the microfibrous web. The application process is not particularly restricted. In one embodiment, the microfibrous web is brought into contact with a solution or dispersion of the means to increase hydrophilicity (for example by spraying, submerging, etc.).

After applying the means to increase hydrophilicity, the resulting microfibrous web is preferably dried. The specific drying conditions depend on the means used to increase hydrophilicity. Usually, a drying temperature of about 40° C. to about 80° C., preferably about 50° C. to about 60° C., is selected. The drying time is usually about 30 s to about 240 s, preferably about 60 s to about 120 s.

It is desirable that prior to the impregnation step the microfibrous web exhibit a liquor pick-up for the fluoropolymer of about 65 wt.-% to about 85 wt.-%, more preferably about 65 wt.-% to about 70 wt.-%, based on the dry weight of the optionally pretreated microfibrous web.

(b) Impregnating the Microfibrous Web with an Impregnation Composition Comprising Fluoropolymer The microfibrous web is impregnated with an impregnation composition comprising fluoropolymer. Suitable fluoropolymers are described above.

The microfibrous web is impregnated using known processes. These processes include spraying, immersion, exhaust process, slop-padding process, and foam impregnation. Immersion impregnation is preferred since it allows a complete impregnation of the microfibrous web.

For the impregnation of the microfibrous web, the fluoropolymer is usually used in the form of a solution or dispersion. The concentration of the solution or dispersion is not particularly restricted and is preferably in the range of about 5 g/l to about 70 g/l, more preferably in the range of about 5 g/l to about 50 g/l.

(c) Drying the Impregnated Microfibrous Web

After the impregnation, the impregnated microfibrous web is dried.

The inventors of the present application have found that the properties of impregnations with fluoropolymers can be influenced by a certain sequence of drying and thermal treatment steps. Without subscribing to a specific theory, they believe that the molecules of the fluoropolymer first deposit statistically on a substrate (such as the present microfibrous web) when the solvent is removed. Due to the statistical (i.e. random) arrangement, the hydrophobic fluorine atoms are at first arranged statistically as well. When the fluoropolymer is exposed to a higher temperature, the molecules of the fluoropolymers reorient themselves with the hydrophobic fluorine atoms preferably rearranging themselves on the surface of the layer.

With the help of absorbency, it can be determined whether a certain temperature can be considered a drying temperature (step (c)) for a certain fluoropolymer or a temperature for the thermal treatment (step (e)).

A test fabric made of cotton EMPA 210, plain weave, bleached, without optical brightener (obtained from EMPA Testmaterialien AG, St. Gallen, Switzerland) is impregnated with 0.5 g fluoropolymer per 100 g cotton fabric by padding and then dried at room temperature. The fabric is then cut into pieces of equal size. The pieces are then heated for 120 s at different temperatures (e.g., 40° C., 50° C., . . . , 140° C., 150° C.), with the temperature difference between the individual steps being 10° C. The exact minimum and maximum temperatures depend on the fluoropolymer and can be determined based on the measured curve. The weight of the individual fabric pieces heated at the temperature $T_i$ was measured as $m_{dry}(T_i)$.

After cooling, the fabric pieces are padded with an aqueous liquor at a pressure of 2 bar and a roller speed of 1.5 m/min.

The weight of the individual fabric pieces heated at the temperature $T_i$ was measured as $m_{wet}(T_i)$.

The liquor pick-up for the fabric piece heated at the temperature $T_i$ is calculated using the following formula:

$$\text{Liquor pick-up}(T_i)[\%] = \frac{m_{wet}(T_i) - m_{dry}(T_i)}{m_{dry}(T_i)} \times 100$$

At low temperatures $T_i$ the liquor pick-up is relatively constant. However, at a certain temperature $T_i$ it suddenly falls to significantly lower values. After an increase, relatively constant values for the liquor pick-up are recorded again despite the increasing temperature $T_i$. In step (c), the drying temperature should be selected in the range wherein the relatively constant high liquor pick-up is observed. In step (e), the temperature of the thermal treatment should be selected in the range wherein the relatively constant low liquor pick-up is observed. The transition range between the two zones is not as suitable. As a rule, the liquor pick-up will be at least 20% in the drying range. As a rule, the liquor pick-up will be at most 10% in the thermal treatment range. However, those numbers are guidelines and may vary depending on the fluoropolymer.

The present invention utilizes this finding. In step (c), the impregnated microfibrous web is dried. During drying, the molecules of the fluoropolymer statistically deposit on the microfibrous web. The drying conditions are selected such that no reorientation of the molecules of the fluoropolymer takes place.

The exact drying conditions depend on the fluoropolymer used. Usually, a drying temperature of about 40° C. to about 110° C., preferably about 50° C. to about 80° C., is selected. The drying time is usually about 10 s to about 240 s, preferably about 30 s to about 120 s.

By impregnating with fluoropolymer, the absorbency of the microfibrous web is adjusted. The fact that the fluoropolymer is simply dried makes is easier to ensure that the polyurethane coating composition does not penetrate the entire microfibrous web. If the fluoropolymer were already thermally treated prior to the application of the polyurethane coating composition, thus causing the molecules of the fluoropolymer to orient themselves, the repellent surface would be more difficult to coat with the coating composition.

It is desirable that after the drying step the microfibrous web exhibit a liquor pick-up for the coating composition of about 30 wt.-% to about 60 wt.-%, more preferably about 30 wt.-% to about 50 wt.-%, based on the dry weight of the impregnated microfibrous web.

(d) Applying a Coating Composition Comprising Polyurethane to Only One Side of the Dried Impregnated Microfibrous Web After the drying step, the coating composition comprising polyurethane is applied to only one side of the dried impregnated microfibrous web. The components of the layer comprising polyurethane were described in detail above.

The coating composition is preferably used in the form of a solution or dispersion of the desired components. The concentration of the polyurethane in the solution or dispersion is preferably in the range of about 50 wt.-% to about 80 wt.-%, more preferably about 60 wt.-% to about 80 wt.-%. By selecting a viscous coating composition, it is easier to guarantee that the layer comprising polyurethane is only present on one side of the finished microfibrous web.

The coating composition is applied to the dried impregnated microfibrous web using known processes. These processes include roll coating, knife coating, spread coating, foam coating, transfer coating and film coating; preferably, a knife coating process is used.

The coating composition is applied such that the layer comprising polyurethane is only present on one side of the finished microfibrous web. FIG. 1 shows a schematic view of a cross-section of a finished microfibrous web coated according to the present invention, wherein, for the sake of simplicity, the microfiber layer is shown as a monolayer.

In the embodiment shown in the figure, the microfibrous web (1) comprises microfibers (2) and conductive fibers (3), whereby in this embodiment the diameter of the conductive fibers (3) is larger than the diameter of the microfibers (2). The fluoropolymer impregnation is not shown in this drawing. The layer (4) comprising polyurethane is only present on one side of the finished microfibrous web.

It goes without saying that during application to the dried impregnated microfibrous web, the coating composition penetrates the microfibrous web to a certain degree. However, within the framework of the present invention, the layer comprising polyurethane must not cover the microfibers on the side of the microfibrous web opposite the one where it was applied. The degree of penetration is preferably at most about 60%, more preferably at most about 40%. The degree of penetration is preferably at least about 20%, more preferably at least about 30%. In the present invention, the degree of penetration is defined as follows:

$$\text{Degree of penetration} = \frac{d_1}{d_2} \times 100$$

$d_1$ Thickness of the part of the microfiber layer which is in contact with the layer comprising polyurethane $d_2$ Thickness of the entire microfiber layer The thickness values can be measured by means of optical processes such as for example microscopy. An example of a possible measuring method is the examination of a cross-section by means of scanning electron microscopy.

In FIG. 1, the degree of penetration is visually suggested by the right brace and the term "x %". In FIG. 1 it is about 50% since the microfibers (white spheres) are embedded to a degree f about 50% in the layer comprising polyurethane.

After the application, the coating composition can be dried in step (d). Alternatively, drying can be foregone and the coating composition can be dried during the thermal treatment in step (e).

If a separate drying step is carried out, the conditions are selected depending on the coating composition. However, they should be selected such that no reorientation of the molecules of the fluoropolymer takes place.

Usually, a drying temperature of about 40° C. to about 110° C., preferably about 80° C. to about 100° C., is selected. The drying time is usually about 10 s to about 240 s, preferably about 10 s to about 120 s.

(e) Thermal Treatment of the Coated Microfibrous Web Obtained in Step (d)

In step (e), the (optionally dried) coated microfibrous web obtained in step (d) is subjected to a thermal treatment. For this step, conditions are selected such that a reorientation of the molecules of the fluoropolymer takes place.

During the thermal treatment, the temperature is usually about 120° C. to about 190° C., preferably about 140° C. to about 180° C. It is of course possible to carry out the thermal treatment in several steps at different temperatures. The length of the thermal treatment is usually about 10 s to about 240 s, preferably about 30 s to about 120 s.

Radiation Protection Device

The coated microfibrous web of the present invention can be used as a covering of a radiation protection material in a radiation protection device wherein the coated microfibrous web is applied to at least one side of the radiation protection material and wherein the side coated with polyurethane is adjacent to the radiation protection material.

Figure 2:
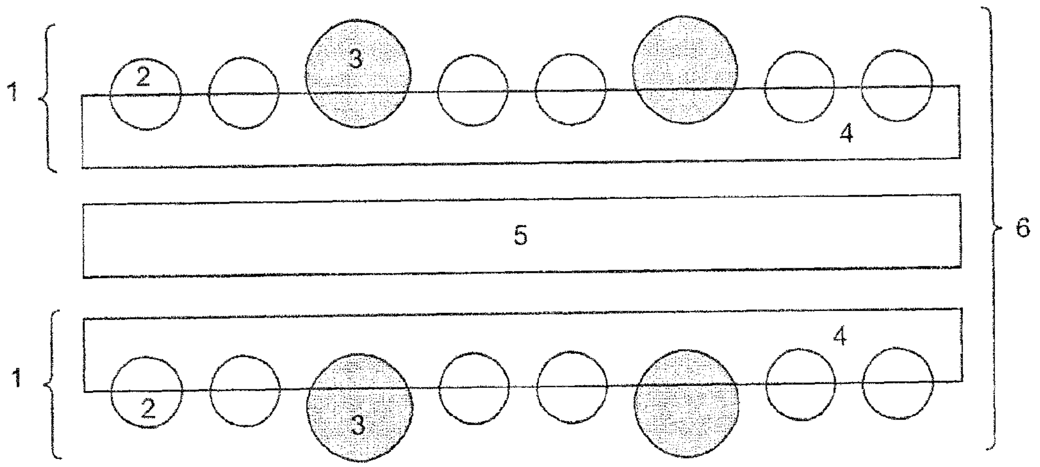
FIG. 2 shows a schematic view of a cross-section of the radiation protection device according to the present invention.

FIG. 2 shows a schematic view of a cross-section of the radiation protection device (6) of the invention. In the embodiment shown in FIG. 2, the microfibrous web (1) comprises microfibers (2) and conductive fibers (3); in this embodiment, the diameter of the conductive fibers (3) is larger than the diameter of the microfibers (2). The fluoropolymer impregnation is not shown in this figure. The layer (4) comprising polyurethane is only present on one side of the finished microfibrous web (1).

In the embodiment shown in the figure, the microfibrous web (1) of the present invention is applied to both sides of the radiation protection material (5), with the layer (4) comprising polyurethane being adjacent to the radiation protection material on each side.

Radiation protection devices include all devices which protect people or objects against harmful radiation, in particular X-ray radiation, UV radiation, infrared radiation, and radioactive radiation, preferably X-ray radiation. Examples include aprons, gloves, shields, curtains, coats, drapes, draping materials, eye protection products, and gowns, but are not restricted to those products. Due to its flexibility and its pleasant haptic properties, the coated microfibrous web of the present invention is especially suitable for flexible radiation protection devices and/or radiation protection devices worn by people.

Within the framework of the present invention, all kinds of radiation protection materials can be used. The type of radiation protection material depends on the radiation to be shielded and is not particularly restricted. For example, radiation protection material based on lead or lead oxide can be mentioned. Lead-free radiation protection material can be used as well. Lead-free radiation protection material is for example disclosed in DE 10 2004 001 328 A, WO 2005/024846 A, WO 2005/023116 A, DE 10 2006 028 958 A, WO 2004/017332 A and DE 10 2005 034 384. Combinations of radiation protection materials are possible as well. The radiation protection material can consist of one or several layers.

In the production of the radiation protection device, the coated microfibrous web of the present invention is applied to at least one side of the radiation protection material. Usually the radiation protection material is enveloped by the coated microfibrous web of the present invention. The microfibrous web and the radiation protection material can be bonded by means of known processes, for example by sewing, gluing, taping, backing, or laminating. When the microfibrous web and the radiation protection material are processed to form a composite, for example by backing or laminating, they can also be processed further to form the finished products using manufacturing processes such as cutting, punching, water-jet cutting, forming, or laser-beam cutting.

The microfibrous web of the present invention protects the radiation protection material. In particular, the radiation protection material is protected against;

- mechanical influences;
- penetration by germs (such as bacteria, viruses and fungi);
- chemical influences for example due to cleaning or disinfecting agents;
- action of light; and/or
- penetration by body fluids such as blood, urine or sweat.

Due to its textile character, the coated microfibrous web imparts a pleasant surface touch to the radiation protection devices which imparts a comfortable fit in particular to articles of clothing.

In contrast to conventional radiation protection devices where a side coated with polyurethane faces away from the radiation protection material, the coated microfibrous web according to the present invention is provided such that the side coated with polyurethane is adjacent to the radiation protection material. Consequently, in case of the conventional design, the side coated with polyurethane faces outward and is therefore subjected to heavy physical loads. This leads to increased wear and abrasion. Due to the design of the present invention wherein the side coated with polyurethane faces inward, the physical load is significantly lower. Surprisingly, in the design of the present invention, the coated microfibrous web exhibits a high degree of cut and tear resistance so that its performance characteristics are clearly superior to those of conventional materials.

The invention is described in more detail based on the following example. However, the invention is not restricted to this embodiment.

EXAMPLE

The microfibrous web was prepared from polyester microfibers with a fiber thickness of 1 dtex and carbon-containing fibers (Belltron B31, available from Kanebo Gohsen Ltd., Japan). The fibers were processed to form a plain weave with about 70 warp threads/cm and about 37 weft threads/cm with a surface density of 100 g/m$^2$. The carbon-containing fibers were incorporated in a lattice design with the measurements 5×5 mm.

The microfibrous web had an air permeability of about 15 l/min per dm$^2$ and an electrostatic surface resistance of about $1\times10^8$ ohm. (measured according to DIN 100015-1 at 25% rel. humidity and 23° C.). The tear resistance values were about 850 N (warp) and about 650 N (weft).

For this example, the microfibrous web was guided over a tenter.

First, 20 g/l Silastol WK (available from Schill+Seilacher, Germany) were applied to the microfibrous web by padding in order to adjust hydrophilicity. After padding, the microfibrous web was dried at 80° C.

Then the microfibrous web was impregnated by padding with 10 g/l Evoral O 35 (fluoropolymer; available from Schill+Seilacher, Germany). The microfibrous web was dried for 90 s at 60° C. No orientation of the molecules of the fluoropolymer took place. The amount of Evoral used amounted to about 0.7 g/100 g of microfibrous web.

After drying, a polyurethane-containing coating was applied to the microfibrous web by knife coating. The coating composition had the following composition:

| | |
|---|---|
| 50 parts | Impranil DLP-R, Bayer (polymer dispersion) |
| 0.2 parts | Agitan 218, Münzing Chemie (deaerator) |
| 0.4 parts | Afrotin FG, Schill + Seilacher (fungicide) |
| 0.4 parts | Byk 333, Byk Chemie (additive for increasing scratch resistance) |
| 0.8 parts | Tegophobe 1650, Degussa (water repellent) |
| 1.2 parts | colloidal silicic acid |
| 41.7 parts | water |

-continued

| | |
|---|---|
| 0.3 parts | Rheolate 255, Elementis (thickener) |
| 4.2 parts | Evoral, Schill + Seilacher (fluoropolymer) |
| 0.8 parts | Hombitec RM 400, Sachtleben Chemie (matting agent) |

The mixing was carried out in a dissolver by adding the ingredients in the order listed above. The stirring time was 35 minutes. The resulting paste was applied extensively as a continuous film to the microfibrous web by means of an air knife.

The coated microfibrous web was gradually dried in a tenter with five fields at a length of 3 m each and a total time of 2 minutes.

Drying Field 1: 80° C.

Drying Field 2: 120° C.

Drying Fields 3 to 5: 160° C.

The resulting microfibrous web was examined in accordance with DIN EN 13795-2 in order to clarify its suitability as a covering for X-ray protection material in a surgical setting. (cfu=colony-forming units).

Barrier Properties:

Bacteria penetration dry: $\log_{10}$ cfu: 0

Passage of liquids: >200 cm

Purity:

Microbiological: $\log_{10}$(cfu/dm$^2$): <0.3.

Particular material: index particular material<3.3

Particle release: $\log_{10}$-particle (2-25 μm)<3.7

Strength:

Bursting strength dry: >750 kPa

Bursting strength wet: >750 kPa

Tear resistance: >750 N/5 cm

Tear resistance: wet: >680 N/5 cm

These measured values show that the material of the present invention is excellently suited for use as a textile in a surgical setting.

The lead-free radiation protection material produced in Example 1 of WO 2005/024846 was cut in the form of a radiation protection apron. The microfibrous web prepared above was cut accordingly and positioned on both sides of the radiation protection material with the layer coated with polyurethane facing the radiation protection material. The microfibrous webs and the radiation protection material were sewn together so that a radiation protection apron was obtained. Due to the use of the microfibrous web described above, the radiation protection apron provided a comfortable fit. No skin irritations occurred. Furthermore, the microfibrous web described above serves as protective harrier for the sensitive radiation protection inlay. The radiation protection apron showed excellent impermeability to blood, urine and microorganisms. It could also be sterilized with ethylene oxide without damage. Thus, the radiation protection apron is very suitable for use in the medical field.

The invention claimed is:

1. An X-ray radiation protection device comprising:
(a) a radiation protection material for shielding against X-ray radiation; and
(b) a coated microfibrous web comprising:
 (i) a microfibrous web impregnated with a fluoropolymer; and
 (ii) a layer comprising polyurethane which is present only on one side of the microfibrous web,
 wherein the coated microfibrous web is provided on at least one side of the radiation protection material and wherein the side coated with polyurethane is adjacent to the radiation protection material.

2. The X-ray radiation protection device according to claim 1, wherein the fluoropolymer is present in an amount of about 0.2 g to about 5 g based on 100 g of the uncoated microfibrous web.

3. The X-ray radiation protection device according to claim 1, wherein the basis weight of the layer comprising polyurethane is about 3 g/m$^2$ to about 50 g/m$^2$.

4. The X-ray radiation protection device according to claim 1, wherein the layer comprising polyurethane furthermore comprises fluororesin in an amount of about 3 parts by weight to about 30 parts by weight, based on 100 parts by weight of polyurethane.

5. The X-ray radiation protection device according to claim 1, wherein the layer comprising polyurethane furthermore comprises silicon dioxide in an amount of about 1 part by weight to about 10 parts by weight, based on 100 parts by weight of polyurethane.

6. The X-ray radiation protection device according to claim 1, wherein the fluoropolymer can be obtained by polymerizing perfluoroalkyl-containing acrylates of the formula $$H_2C{=}CR{-}C(O){-}O{-}(CH_2)_n{-}C_mF_{2m+1}$$

wherein
R is H or $CH_3$;
n is 0 to about 8; and
m is about 4 to about 12.

7. The X-ray radiation protection device according to claim 6, wherein the fluoropolymer is a copolymer obtainable by copolymerizing perfluoroalkyl-containing acrylates with
(i) at least one alkyl-containing acrylate of the formula $$H_2C{=}CR{-}C(O){-}O{-}C_pH_{2p+1}$$

wherein
 R is H or $CH_3$; and
 p is about 1 to about 12;
 and/or
(ii) at least one functional monomer of the formula $$H_2C{=}CR{-}C(O){-}O{-}C_pH_{2p}X$$

wherein
 R is H or $CH_3$;
 p is about 1 to about 12; and
 X is a functional group selected from OH, SH, $NH_2$, and N-methylolsulfonamide.

8. The X-ray radiation protection device according to claim 1, wherein the radiation protection material does not contain lead.

9. The X-ray radiation protection device according to claim 1, wherein the coated microfibrous web is provided on both sides of the radiation protection material and wherein on each side the sides coated with polyurethane are adjacent to the radiation protection material.

10. An X-ray radiation protection device comprising:
(a) a radiation protection material for shielding against X-ray radiation; and
(b) a coated microfibrous web,
wherein the coated microfibrous web is provided on at least one side of the radiation protection material, and said coated microfibrous web is formed by
 (a) impregnating the microfibrous web with an impregnation composition comprising a fluoropolymer;
 (b) drying the impregnated microfibrous web;
 (c) applying a coating composition comprising polyurethane to only one side of the dried, impregnated microfibrous web; and
 (d) thermally treating the microfibrous web obtained in step (c), wherein the side coated with polyurethane is adjacent to the radiation protection material.

11. The X-ray radiation protection device according to claim 10, wherein the drying in step (b) is carried out at a temperature in the range of about 40° C. to about 110° C. for a time period of about 10 s to about 240 s.

12. The X-ray radiation protection device according to claim 10, wherein the thermal treatment in step (d) is carried out at a temperature in the range of about 120° C. to about 190° C. for a time period of about 10 s to about 240 s.

13. The X-ray radiation protection device according to claim 10, wherein the drying of the impregnated microfibrous web in step (b) is carried out such that the molecules of the fluoropolymer statistically deposit on the microfibrous web and no reorientation of the fluoropolymer molecules takes place.

14. The X-ray radiation protection device according to claim 10, wherein the thermal treatment in step (d) is carried out such that a reorientation of the fluoropolymer molecules takes place wherein the hydrophobic fluorine atoms preferably arrange themselves on the surface of the layer.

* * * * *